(12) United States Patent
Wind et al.

(10) Patent No.: US 9,652,191 B2
(45) Date of Patent: May 16, 2017

(54) ELECTRONIC BEACON, USE OF THE ELECTRONIC BEACON, A PRINT SYSTEM COMPRISING AN ELECTRONIC BEACON AND A METHOD FOR AN ELECTRONIC BEACON IN A PRINTED PRODUCT PRODUCTION PROCESS

(71) Applicant: OCÉ-TECHNOLOGIES B.V., Venlo (NL)

(72) Inventors: Anne A. Wind, Eindhoven (NL);
Frederik De Jong, Swalmen (NL);
Jacoba A. H. Jansen, Venlo (NL);
Christelle L. E. Harkema, Eindhoven (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/093,992

(22) Filed: Apr. 8, 2016

(65) Prior Publication Data

US 2016/0224297 A1    Aug. 4, 2016

Related U.S. Application Data

(63) Continuation of application No. PCT/EP2014/071518, filed on Oct. 8, 2014.

(30) Foreign Application Priority Data

Oct. 9, 2013   (EP) ..................................... 13187805

(51) Int. Cl.
*G06F 3/12*   (2006.01)
*H04W 4/02*   (2009.01)

(52) U.S. Cl.
CPC .......... *G06F 3/1292* (2013.01); *G06F 3/1204* (2013.01); *G06F 3/126* (2013.01);
(Continued)

(58) Field of Classification Search
CPC combination set(s) only.
See application file for complete search history.

(56) References Cited

U.S. PATENT DOCUMENTS

| | | | | | |
|---|---|---|---|---|---|
| 6,008,727 | A | * | 12/1999 | Want | G06K 7/0008 340/10.42 |
| 6,860,422 | B2 | * | 3/2005 | Hull | G06Q 10/10 235/375 |

(Continued)

FOREIGN PATENT DOCUMENTS

EP          0 794 507 A2    9/1997

*Primary Examiner* — Barbara Reinier
(74) *Attorney, Agent, or Firm* — Birch, Stewart, Kolasch & Birch, LLP

(57) ABSTRACT

An electronic beacon is used in a print system connected to an at least partially wireless network system. The electronic beacon is linkable to the print job via the network system, placeable on top of, attachable to or insertable in a physical intermediate product or a physical end product resulting from the print job. The electronic beacon includes a switch for activating and deactivating the electronic beacon, a memory for storing a link to the print job, and a signaling device for giving an electronic signal when the print job linked to the electronic beacon is selected on a mobile device connected to the network system. Upon detection that a mobile device and an electronic beacon are in each other's proximity, a link of a print job selected on the mobile device is sent via the network system to the memory of the electronic beacon upon activation of the electronic beacon, a link of a print job stored in the memory of the electronic beacon is sent via the network system to the mobile device, and a link of a print job stored on the electronic beacon is deleted from the memory of the electronic beacon upon deactivation of the electronic beacon.

12 Claims, 13 Drawing Sheets

(52) U.S. Cl.
CPC .......... *G06F 3/1207* (2013.01); *G06F 3/1259* (2013.01); *H04W 4/02* (2013.01)

(56) References Cited

U.S. PATENT DOCUMENTS

| | | | | |
|---|---|---|---|---|
| 7,005,968 | B1* | 2/2006 | Bridgelall | G01S 13/876 |
| | | | | 340/10.42 |
| 7,023,344 | B2* | 4/2006 | Schaper | G06K 17/00 |
| | | | | 340/539.13 |
| 7,724,142 | B2* | 5/2010 | Nikitin | G06K 19/04 |
| | | | | 340/10.1 |
| 8,378,789 | B2* | 2/2013 | Moore | G06K 7/10336 |
| | | | | 340/10.1 |
| 8,493,601 | B2* | 7/2013 | Hull | G06F 17/30876 |
| | | | | 235/385 |
| 8,754,754 | B2* | 6/2014 | Kamel | G06K 17/00 |
| | | | | 340/10.1 |
| 8,848,220 | B2* | 9/2014 | Giannetti | G06F 3/1207 |
| | | | | 358/1.15 |
| 9,247,634 | B2* | 1/2016 | Kruest | G06K 7/0008 |
| 2004/0074961 | A1 | 4/2004 | Hull et al. | |

* cited by examiner

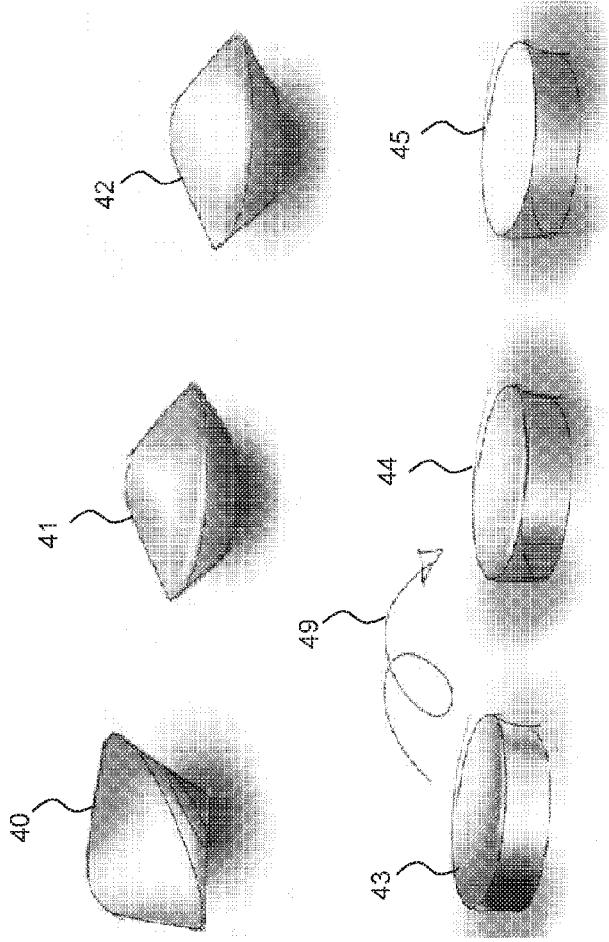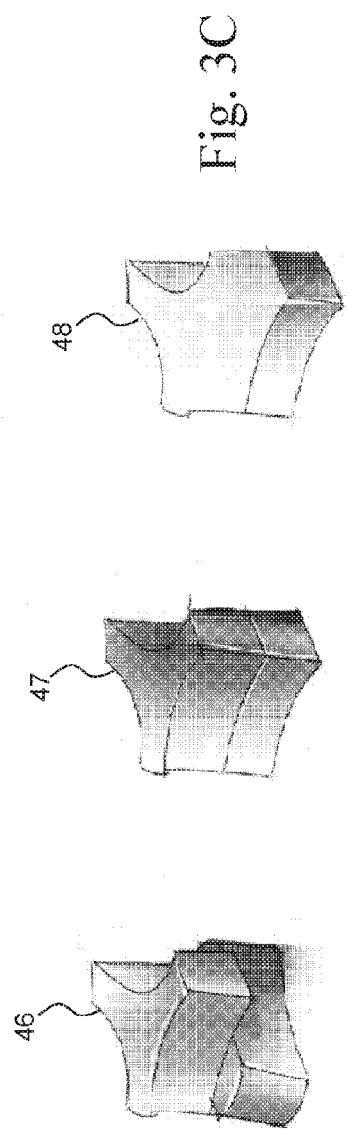

ELECTRONIC BEACON, USE OF THE ELECTRONIC BEACON, A PRINT SYSTEM COMPRISING AN ELECTRONIC BEACON AND A METHOD FOR AN ELECTRONIC BEACON IN A PRINTED PRODUCT PRODUCTION PROCESS

CROSS-REFERENCE TO RELATED APPLICATIONS

This application is a Continuation of International Application No. PCT/EP2014/071518, filed on Oct. 8, 2014, and for which priority is claimed under 35 U.S.C. §120. PCT/EP2014/071518 claims priority under 35 U.S.C. §119(a) to Application No. 13187805.0, filed in Europe on Oct. 9, 2013. The entire contents of each of the above-identified applications are hereby incorporated by reference into the present application.

BACKGROUND OF THE PRESENT INVENTION

1. Field of the Invention

The present invention relates to an electronic beacon for localizing a physical intermediate product in a printed product production process comprising production modules for producing physical intermediate products and/or physical end products according to a print job for the printed product production process.

2. Description of Background Art

Tracking systems for intermediate products and end products of a print system comprising a plurality of production modules exist. Each production module is capable of producing an intermediate product or an end product. Print jobs are submitted to the print system in order to process the print job by the production modules of the print system. Examples of production modules are a print engine, a cutting device, a folding device, a binding device, a perforator, a stacker, a finisher, a packaging device, etc. A starting product of the print job is usually digital, such as a digital image to be printed by a printer, and intermediate products are analogue, such as a stack of printed paper. In a print system like a print room, many intermediate products have to be processed in a same production period. QR codes or barcodes may be printed on an intermediate product to identify the intermediate product.

SUMMARY OF THE INVENTION

It is an objective of the present invention to facilitate an easier way of tracking and tracing print jobs, in particular when the intermediate product is analogue.

According to the present invention, this object is achieved by an electronic beacon, wherein the electronic beacon is digitally assignable to the print job, placeable on top of, attachable to or insertable in a physical intermediate product resulting from the print job or a physical end product resulting from the print job. The electronic beacon comprises a receiver configured to receive a localization request issued by a mobile device, a signaling device configured to provide an electronic signal when the localization request is received by the receiver, a proximity detector configured to detect if a mobile device is in the proximity of the electronic beacon, and a transmitter configured to send an assignment request for removing an assignment of the print job from the electronic beacon and for adding an assignment of the print job to a mobile device, which is determined to be in the proximity of the electronic beacon by the proximity detector, and a switch configured to deactivate the electronic beacon. Upon deactivation of the electronic beacon by the switch, the assignment request is sent by the transmitter. Further on, an electronic beacon to which a print job is assigned will also be said to be loaded with a print job.

A link of a print job to the electronic beacon stored in a memory of the printed product production process environment is sent via a network system to the mobile device, and the link of the print job to the electronic beacon is deleted from the memory upon deactivation of the electronic beacon. A new link of the print job to the mobile device is established in the memory. The electronic beacon is removed from the physical intermediate product in order to let the physical intermediate product be processed by a next production module.

According to an embodiment of the electronic beacon, the switch is configured to activate the electronic beacon and the transmitter is configured to send a further assignment request for removing an assignment of the print job from a mobile device, which is determined to be in the proximity of the electronic beacon by the proximity detector, and for adding an assignment of the print job to the electronic beacon, wherein upon activation of the electronic beacon by the switch, the further assignment request is sent by the transmitter.

A link of a print job to the mobile device stored in the memory of the printed product production process environment is sent via a network system to the electronic beacon, and the link of the print job to the mobile device is deleted from the memory upon activation of the electric beacon. A new link of the print job to the electronic beacon is established in the memory. Instead of a link, a pair of identifiers of an electronic beacon and a print job and/ or a pair of identifiers of a mobile device and a print job is envisioned to be stored in the memory. The electronic beacon is placed on top of or inserted in the physical intermediate product or a physical end product after the physical intermediate product respectively the physical end product is processed by a production module.

An application on the mobile device displays a list of tasks derived from print jobs. By means of the electronic beacon, a print job is traceable. Intermediate products of the print jobs are retrievable by means of the signaling device of the electronic beacons. The application informs which print jobs have to be done and explains the tasks how the print job should be done. The application also alerts the user in case of a media shortage, a toner shortage, an error occurrence, a maintenance request or a rush job.

According to an embodiment of the electronic beacon, the signaling device comprises at least one of a light signaling device and a sound signaling device. The electronic signal informs the user where the intermediate product of the print job is located.

The electronic beacons are used to track the print jobs. An electronic beacon is placed on top of a stack of media sheets or inserted in a core of a roll of media. The electronic beacon first needs to be made active in order to load an electronic beacon with a print job, i.e. in order to store a link of the electronic beacon to the print job in the memory.

According to an embodiment of the electronic beacon, the signaling device is configured to issue an electronic signal in accordance with a rhythm applied to the mobile device. This is advantageous in order to avoid collision of signals when more than one operator is sending a localization request by means of his mobile device to an electronic beacon via the network system. The operator may configure the mobile device to send the localization request accompanied with a personal rhythm. In this way, the operator recognizes an electronic beacon imitating his own rhythm by means of the signaling device when sending the request.

According to an embodiment of the electronic beacon, the switch is configured to change the shape of the electronic beacon when the electronic beacon is activated or deactivated. By creating a first shape for the electronic beacon when the electronic beacon is activated, and creating a second shape different from the first shape for the electronic beacon when the electronic beacon is de-activated, an operator is able to easily recognize if an electronic beacon is activated or not.

According to a further embodiment of the electronic beacon, the switch comprises a pressing mechanism to enlarge the footprint of the electronic beacon when the electronic beacon is activated, in order to establish a stable upright position of the electronic beacon due to the larger footprint and reduce the footprint of the electronic beacon when the electronic beacon is deactivated in order to establish a tilt of the electronic beacon from the upright position of the electronic beacon. The electronic beacon may be pressed on the stack or inserted in a roll of media. When the user is nearby the active electronic beacon, he is able to load the electronic beacon with a selected job in his application on the mobile device, for example by a gesture of swiping upwards. At that moment, the electronic beacon is loaded (via the network system) with the print job. Only a link to the print job may be loaded into the memory of the printed product production process environment. A pair of identifiers of the electronic beacon and the print job is envisioned to be stored in the memory. This action creates a digital counterpart of the analogue intermediate product.

A loaded beacon can inform the user in two ways.

Firstly, when the user selects a job in his application on the mobile device for localization of the assigned electronic beacon, the electronic beacon will receive a localization signal via the network. The electronic beacon will issue an electronic signal by the signaling device such as a light signal and/or a sound signal. The signaling device may be configured to issue an electronic signal in accordance with a tapping rhythm applied to the mobile device by the operator. In order to check, the user can, for example, tap the print job in his selection list in the application on the mobile device in a certain rhythm and the electronic beacon will issue the electronic signal in that same rhythm.

Secondly, when a user holds his mobile device nearby an electronic beacon, the application on the mobile device will show which print job is loaded on the electronic beacon and what the next tasks of the print job are.

By means of the application on the mobile devices and the electronic beacons, print jobs can be tracked and traced, which provides an overview where the print jobs are, an up-to-date status overview, and a flexibility in priority of jobs. Tasks as alerts can easily be sent. The network system may be at least partially realized in so-called cloud systems. The electronic beacon is advantageous, since it can track analogue tasks where a MIS system can only track digital jobs. The electronic beacon is also advantageous when a planning of print jobs changes. The loading of a print job on an electronic beacon and the unloading of a print job from an electronic beacon is more flexible than the use of paper beacons like work order forms. By means of the electronic beacon, productivity is maximized in an environment of creating many different and unique intermediate products where planning in advance is not possible. By means of the electronic beacon and the application on the mobile device, information about the status of the print jobs is up-to-date and the order of the print jobs may be influenced at any time.

According to an embodiment, the switch of the electronic beacon is configured to change the shape of the electronic beacon when the electronic beacon is activated or deactivated. By having a different shape for an activated beacon than for a deactivated beacon, it is easily recognized that an electronic beacon is active or not.

The invention also relates to a print system comprising a plurality of production modules for producing physical intermediate products and physical final products, a plurality of electronic beacons according to any of the previous embodiments of the electronic beacon, at least one mobile device configured for installing and running an application for displaying a selection list of tasks of print jobs for the print system, the at least one mobile device being synchronizable by means of an at least partially wireless network system with the plurality of production modules and with the plurality of beacons.

The invention also relates to a method for tracking jobs in a print system according to the invention, the method comprising the steps of determining that a mobile device and an electronic beacon are in each other's proximity, upon activation of the electronic beacon, assigning a print job selected on the mobile device to the electronic beacon, and upon deactivation of the electronic beacon, de-assigning the print job from the electronic beacon and assigning the print job to the mobile device.

The invention also relates to a method for tracking jobs in a print system according to the invention, the method comprising the steps of selecting a print job on a mobile device, sending a localization request from the mobile device to the network system for localizing an electronic beacon to which beacon the print job has been assigned, retrieving by the network system an identification of the electronic beacon to which the print job has been assigned, sending by the network system a localization request to the identified electronic beacon, receiving the localization request by the identified electronic beacon, and activating the signaling device of the identified electronic beacon by the identified electronic beacon.

The invention also relates to a non-transitory recording medium comprising computer executable program code configured to instruct at least one computer to perform a method according to any of the methods of the present invention.

It may be clear for the skilled person that the previous embodiments of the printer system may be combined in one way or another resulting in embodiments which also fall under the scope of the invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A-3C show shapes of the beacon in an inactive state, in an active state and in a signaling state according to the present invention;

DETAILED DESCRIPTION OF THE PREFERRED EMBODIMENTS

Figure 1:
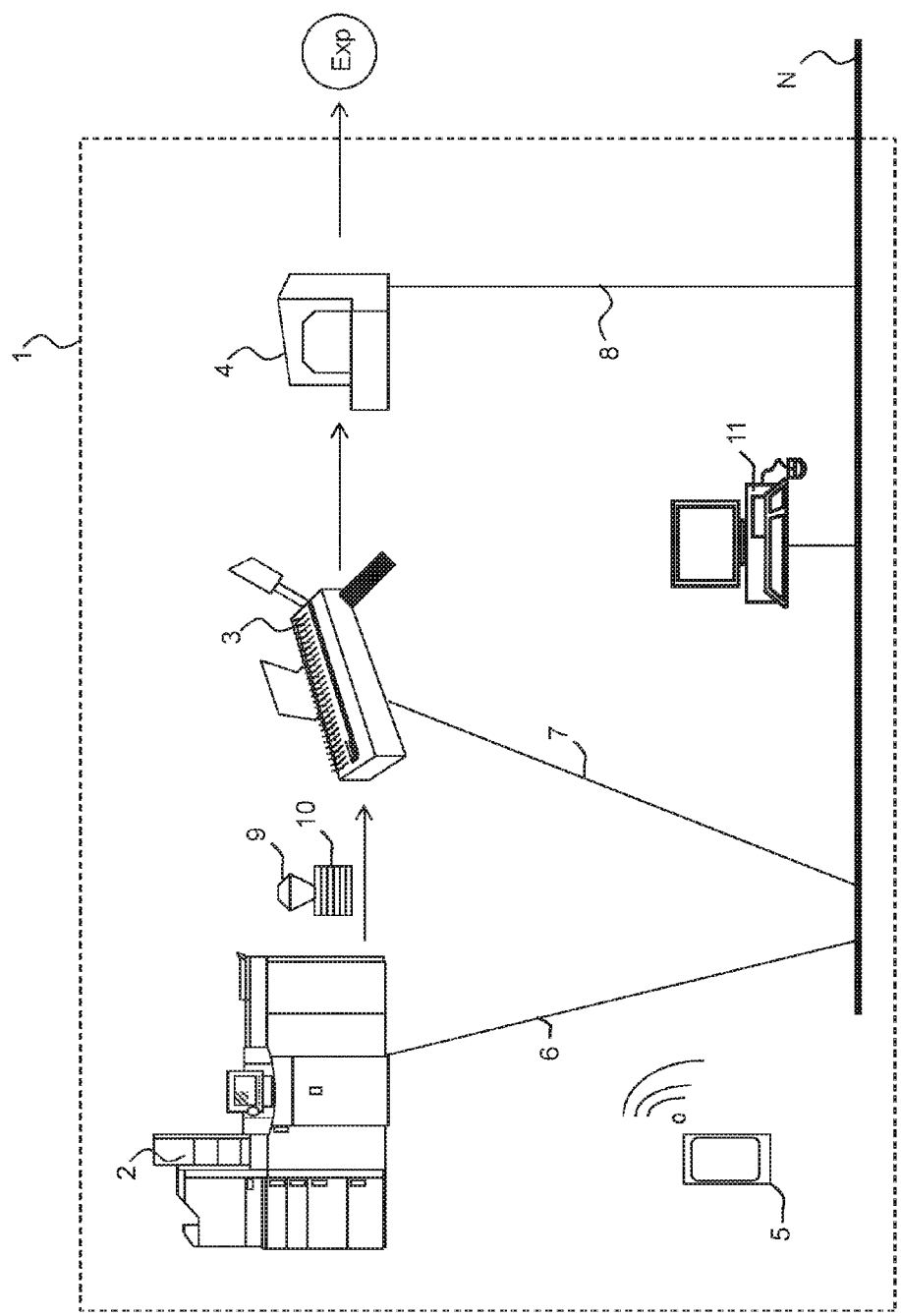
FIG. 1 schematically shows a printed product production process using an electronic beacon according to the present invention.

The present invention will now be described with reference to the accompanying drawings, wherein the same reference numerals have been used to identify the same or similar elements throughout the several views.

FIG. 1 shows a printed product production process environment 1 comprising a workstation 11, which may be a personal computer or another device for preparing image data for prints to be printed or for collecting print jobs submitted to a print system 2. The workstation 11 also comprises a planning application for scheduling print jobs to production modules in the printed product production process environment 1. The workstation 11 may even be a server computer system residing in a cloud system elsewhere. The workstation 11 has access to a network N for transferring the image data to the print system 2 that is configured to receive print jobs for making prints. The print system 2 is suitable for applying recording material on media in order to print a print job on the media. The print system 2 is wired or wirelessly connected to the network N and the workstation 11 via a network line 6, which may be wireless. The network N may be a remote cloud system. The printed product production process environment 1 also comprises a mobile device 5, which is wirelessly connected to the network N. The communication from network N to the mobile device 5 and vice versa may be established by at least one of an IrDA system, a wireless USB system, a blue-tooth system, a Z-Wave system, a ZigBee system, a body area network, a WiFi connection, a RuBee system, a 6LoWPAN system, a Wireless Gigabit system, a wireless Firewire system, an IAN system, a NAN system, a LAN system and a HomeRF system. The mobile device 5 comprises a user interface for displaying a print job list for the operator. Each print job comprises at least one task. For example, a first print job may have a print task, a punching task, a binding task and an expedition task, and a second print job may have only a punching task, a binding task and a packaging task. Other tasks like maintenance tasks may be envisioned. The printed product production process environment 1 further comprises a second production module 3 which is a puncher 3, and a third production module 4 which is a binder 4. It is noted that the first production module 2, the second production module 3 and the third production module 4 are arbitrarily selected and other production modules may be envisioned which form a configurable plurality of production modules in order to produce an end product via resulting products. In FIG. 1, print job data and print job specifications are submitted to the workstation 11. The workstation 11 sends the job information to the print system 2. The print system 2 delivers, in a first production step, a first resulting product 10, being media on which the image or images specified in the print job specifications will be printed. The first resulting product is input for the puncher 3. The puncher 3 will deliver in a second production step a second resulting product (not shown), printed media with holes. The second resulting product is input for the binder 4. The binder 4 delivers in a third production step a third resulting product (not shown), bound printed media with holes. In this example, the third resulting product is the end product of the printed product production process and is delivered to an expedition department Exp. When the first resulting product 10 is ready, an electronic beacon 9 is placed on top of the stack of media sheets produced by the printing system 2. The electronic beacon 9 is wirelessly connected to the network N. The communication from network N to the electronic beacon 9 and vice versa may be established by at least one of an IrDA system, a wireless USB system, a blue-tooth system, a Z-Wave system, a ZigBee system, a body area network, a WiFi connection, a RuBee system, a 6LoWPAN system, a Wireless Gigabit system, a wireless Firewire system, an IAN system, a NAN system, a LAN system and a HomeRF system.

Figure 2B:
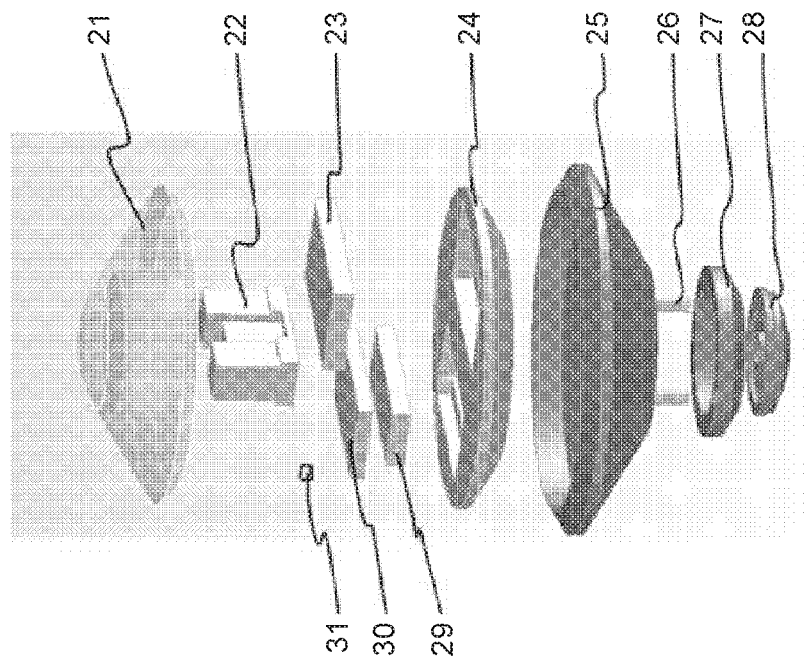
FIGS. 2A-2B schematically show an embodiment of an electronic beacon according to the present invention.
Figure 2A:
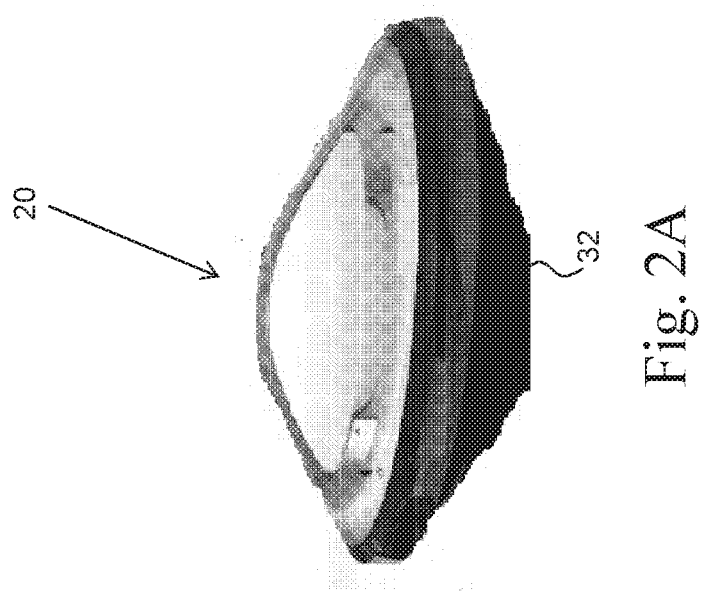

FIGS. 2A-2B schematically show an embodiment of an electronic beacon according to the present invention. The electronic beacon is used for localizing the physical intermediate product 10 in the printed product production process environment 1 as shown in FIG. 1. FIG. 2A shows an electronic beacon 20 in an assembled form. FIG. 2B shows the disassembled electronic beacon 20 into its parts 21-31. The electronic beacon 20 comprises a lens 21, which is transparent for light from a signaling device, for example light emitting diodes 31 (LEDs) residing in the upper half of the electronic beacon 20. In addition, the electronic beacon 20 includes switches 22 for switching the LEDs 31 on and off, a voltage source 23 for delivering a voltage to the LEDs 31 and a controller 30, the controller 30 being configured for controlling the LEDs 31, a wireless signal receiver/transmitter 29 configured to receive signals from a network N or from a mobile device 5 and for sending signals to the network N or to a mobile device 5 (See FIG. 1), a frame 24 for framing the beacon 20, a housing 25 for keeping the parts of the beacon together, springs 26 for enabling an un-pressed shape and a pressed shape of the beacon, a ring 27 for giving the beacon a stable position when pressed, and a button 28 which can be pressed into the ring 27 and the housing 25. The proximity detector may be incorporated in the wireless signal receiver/transmitter 29. The proximity of a mobile device may be established by means of at least one of a blue-tooth communication system, a NFC communication system, a Body Area Network system and a WiFi communication system. The electronic beacon 20 is digitally assignable to a print job and placed on top of the stack 10 (See FIG. 1) of printed media resulting from the printing system 2.

The electronic beacon 20 is configured to receive a localization request from the network N. The localization request is issued by the mobile device 5 to the network N. The workstation 11 of FIG. 1 comprises a list of print jobs, a list of identification numbers of the electronic beacons, a list of which beacons are active and inactive, a first double list of entries, each entry representing a print job or job task assigned to an identification number of an electronic beacon, a second double list of entries, each entry representing a print job or job task coupled to a mobile device, i.e. assigned to an operator who is using the mobile device. When a print job or job task is assigned to a beacon it cannot be assigned to an operator. When a print job is coupled to an operator is cannot be assigned to a beacon.

The electronic beacon comprises a proximity detector configured to determine if a mobile device 5 is in the proximity of the electronic beacon 9 (See FIG. 1). The proximity detector may be a responder residing in the electronic beacon for responding to an electronic signal sent by a proximity detector residing in a mobile device 5. On the other hand, the proximity detector may be a proximity detector residing in the electronic beacon 9 for sending an electronic signal to a mobile device 5 in its proximity, which mobile device 5 then sends an electronic signal back to the electronic beacon 9.

The electronic signal receiver/transmitter 29 is configured to send an assignment request for removing an assignment of a print job from the electronic beacon and for adding an assignment of the print job to a mobile device which is determined to be in the proximity of the electronic beacon by the proximity detector. The springs 26 operate as an operating mechanism or switch to deactivate the electronic beacon. Upon deactivation of the electronic beacon by upside pressing of the beacon, the assignment request is sent by the electronic signal receiver/transmitter 29 to the network N (FIG. 1).

In a further embodiment, the springs 26 are also suitable for activating the electronic beacon and the receiver/transmitter 29 is also suitable for sending a further assignment request for removing an assignment of the print job from a mobile device 5, which is determined to be in the proximity of the electronic beacon by the proximity detector of the beacon 9 or of the mobile device 5, and for adding an assignment of the print job to the electronic beacon 9. Upon activation of the electronic beacon by the springs 26, the further assignment request is sent by the receiver/transmitter 29 to the network N (FIG. 1).

When the beacon 20 is pressed as shown in FIG. 2A, the beacon 20 has a flat bottom surface 32 for standing in an upright position. The beacon 20 is now in an active state or online state, which will be elucidated hereinafter. When the beacon is pressed again, the flat bottom surface changes into a pointed bottom and gets an inactive state or offline state, which will be elucidated hereinafter. The beacon 20 may be envisioned to have an arbitrary shape as long as two states, an active state and an inactive state, can be achieved and distinguished. Other shapes of the beacon will be shown in FIG. 3A-3C.

FIG. 3A-3C show several shapes of the beacon in an inactive state, in an active state and in a signaling state. Changing the beacon from an active state to an inactive state and vice versa is not accidental but a conscious act of the operator.

FIG. 3A shows the beacon in a shape of a kind of whirligig. The beacon in FIG. 3A is changing position when activated or deactivated by the operator. The beacon 40 is in an inactive state and tilted due to its pointed bottom. The beacon 41 is in an active state and standing upright due to its flat bottom surface. The beacon 42 is in an active state and the signaling device is also activated, a light is sent out from the LEDs in the upper half of the beacon 42 through the lens of the beacon 42.

FIG. 3B shows the beacon in the shape of a puck. The beacon in FIG. 3B is changing orientation when activated or deactivated. The beacon 43 is in an inactive state, for example by a red light on top of the beacon 43. When the beacon 43 is turned upside down, as indicated by rotating arrow 49, it becomes active. Beacon 44 shows the active state of the beacon. The beacon 45 is in an active state and the signaling device is also activated sending light, for example a white or green light.

FIG. 3C shows the beacon in a two-part triangular shape. The beacon in FIG. 3C is changing shape when activated or deactivated. The beacon 46 is in an inactive state, for example by an orientation of the upper half of the beacon 46, which is twisted towards the lower half of the beacon 46. When the upper half of the beacon 46 is aligned with the lower half of the beacon 46, the beacon becomes active. Beacon 47 shows the active state of the beacon. The beacon 48 is in an active sate and the signaling device is also activated sending light, for example a white or green light.

FIGS. 4-10 show specific cases of the use of the beacon in a printed product production process environment. Each of FIGS. 4-10 show a cloud system CS, which is a network of remote electronic computers for storing of files and remotely running of software applications and software systems like job planning applications. Also within the scope of the present invention falls a local network N to which computers are attached for storing of files and remotely running of software applications and software systems like job planning applications. Such a local network N may be used at least partially instead of the cloud system CS.

Figure 4:
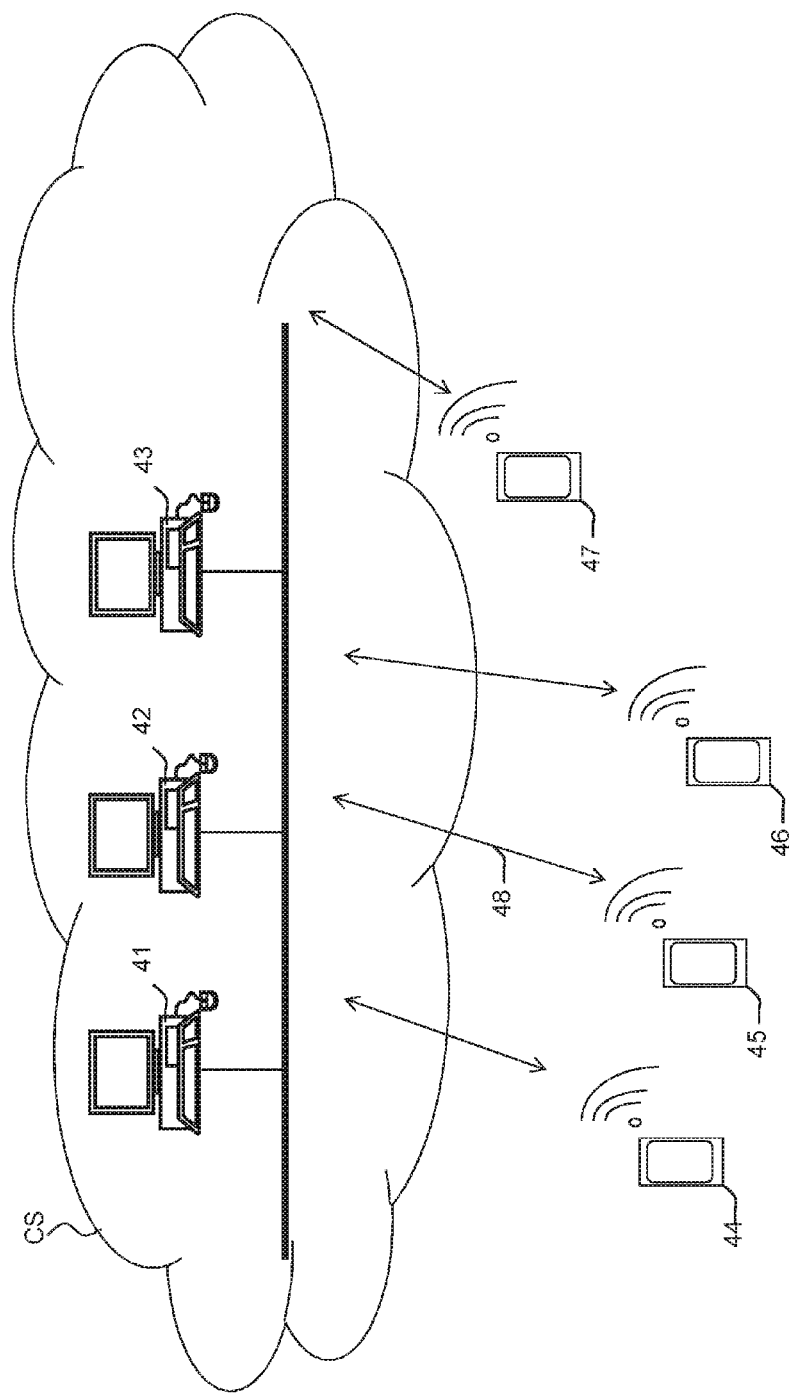
FIGS. 4-10 schematically show cases for use of the electronic beacon in a printed product production process environment according to the present invention.

FIG. 4 shows computer systems 41-43 coupled to the cloud system CS. A job planning application resides on the computer system 41. The job planning application has a planning of jobs and/or tasks of jobs for each mobile device 44-47 in the printed product production process environment. Each mobile device 44-47 is synchronized with respect to the scheduling of the tasks and jobs to the job planning application and vice versa as indicated by the bidirectional arrows 48.

Figure 5:
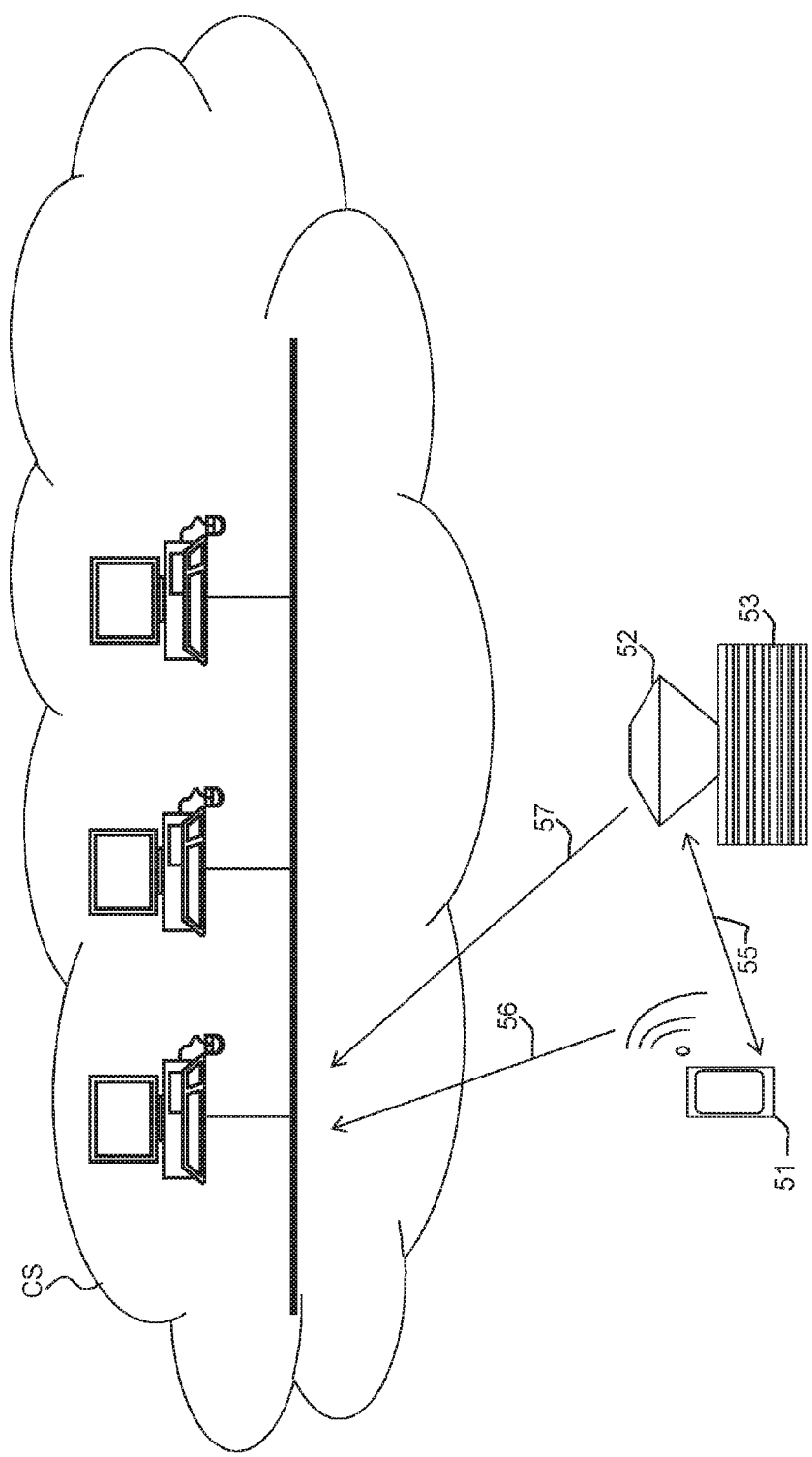

FIG. 5 elucidates a first case, wherein a user wants to assign a print job to an electronic beacon 52. FIG. 5 shows a mobile device 51, the electronic beacon 52 and the cloud system CS. The electronic beacon 52 is placed on top of a stack of sheets 53 and is activated. The active state of the electronic beacon 52 has been registered in the cloud system CS via an electronic signal 57 sent from the wireless signal receiver/transmitter 29 (not shown in FIG. 5) of the electronic beacon 52 to the cloud system CS. In another embodiment, the electronic signal 57 is sent via the mobile device 51 to the cloud system CS. The electronic beacon 52 has an identification number, which is also registered in the cloud system CS, for example beacon no. 3. The mobile device 51 detects the proximity of the electronic beacon 52 by means of signal 55 of a Blue-Tooth system or any other proximity detecting system as mentioned hereinabove. On the display of the mobile device 51, the print job is selected from a job list for uploading the print job to the electronic beacon 52. The print job to be selected is the print job which has the stack of sheets 53 as an intermediate product. Another signal 56 is sent from the mobile device 51 to the cloud system CS. In the cloud system CS, the print job is registered as being assigned to the electronic beacon 52 by means of the identification number 3, which is the identification number of the electronic beacon 52. The print job is then removed from the job list of the mobile device 51.

Figure 6:
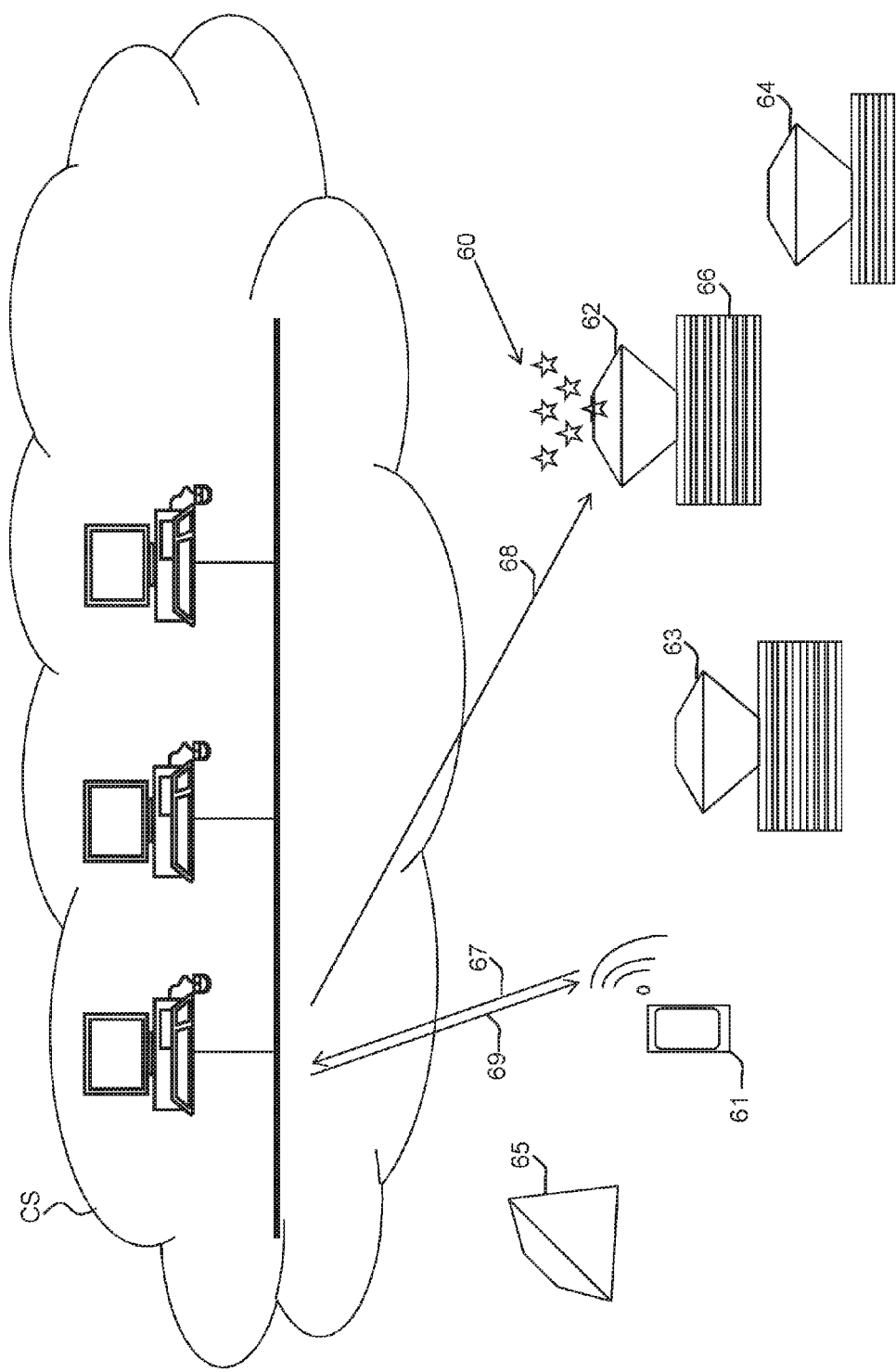

FIG. 6 elucidates a second case, wherein a user wants to find an electronic beacon 62 assigned to a print job selected on a mobile device 61. FIG. 6 shows the mobile device 61, a plurality of electronic beacons 62-65 and the cloud system CS. Each of the electronic beacons 62-64 is placed on top of a stack of sheets and is activated, while the electronic beacon 65 is not activated. The user selects the print job on his mobile device 61 for retrieval of the appropriate electronic beacon. An electronic signal 67 is sent from the mobile device 61 to the cloud system CS. The job scheduling system residing in the cloud system CS looks up the identification number of the electronic beacon, which is assigned to the selected print job. The identification number of the assigned electronic beacon is the identification number of electronic beacon 62, which is placed on top of a stack of sheets 66. An electronic signal 68 is sent from the cloud system CS to the electronic beacon 62. The electronic signal 68 is an electronic signal for activating the signaling device of the electronic beacon 62, for example a light on signal. This signal 68 is received by the wireless signal receiver/transmitter 29 (not shown in FIG. 6) of the electronic beacon 62. The signaling device of the electronic beacon 62 is activated as indicated by the stars 60 above the electronic beacon 62. The user senses the result of the activation of the signaling device of the electronic beacon 62, for example a white or colored light or a sound.

Figure 7:
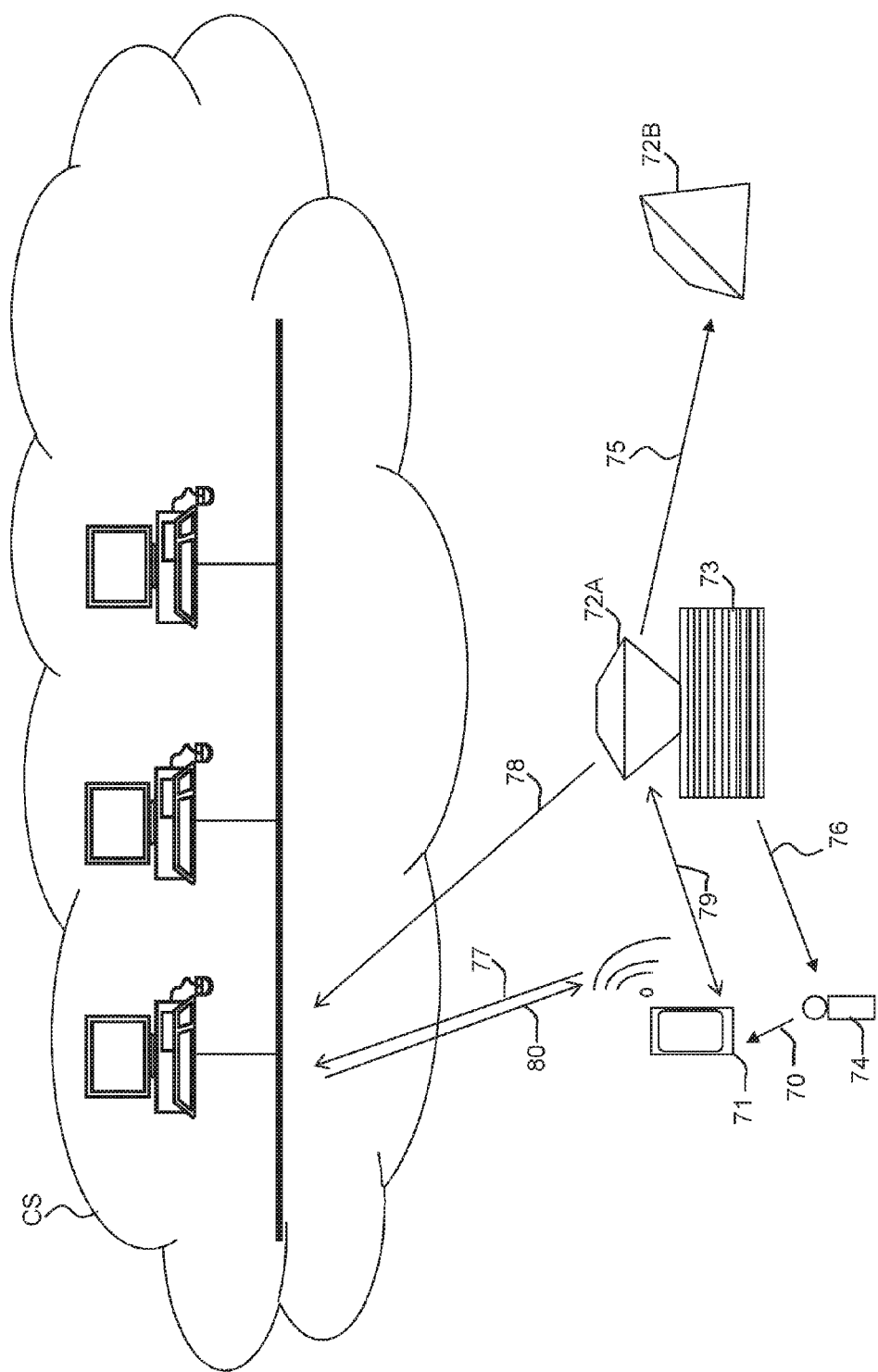

FIG. 7 elucidates a third case, wherein a user 74 wants to go on with a print job. The print job is assigned to an electronic beacon 72A, which is activated and put on top of a stack 73 of sheets. The user 74 is carrying a mobile device 71, as indicated by a first arrow 70. The blue-tooth system, as indicated by a double-sided arrow 79, detects the proximity of the electronic beacon 72A and the mobile device 71. The mobile device 71 sends an electronic signal 77 to the cloud system CS that the proximity of the electronic beacon 72A and the mobile device 71 has been detected. The user 74 deactivates the electronic beacon 72A by pressing on top of the electronic beacon 72A. The pressing of the electronic beacon 72A changes the shape of the electronic beacon 72A into a deactivated shape 72B as indicated by a second arrow 75. The user 74 takes the electronic beacon 72A from the stack 73 of sheets. The electronic beacon sends a deactivating signal 78 to the cloud system CS comprising the identification number of the electronic beacon 72A. The job planning application residing in the cloud system CS de-assigns the electronic beacon 72A from the print job by means of the identification number of the electronic beacon 72A and assigns the mobile device 71 of the user 74 to the print job. The job list of user 74 displayed at his mobile device 71 is synchronized with the planning application in the cloud system CS by means of an electronic signal 80 from the cloud system CS to the mobile device 71. The user 74 takes the intermediate product 73 as indicated by a third arrow 76 for further processing on a next production module (not shown).

Figure 8:
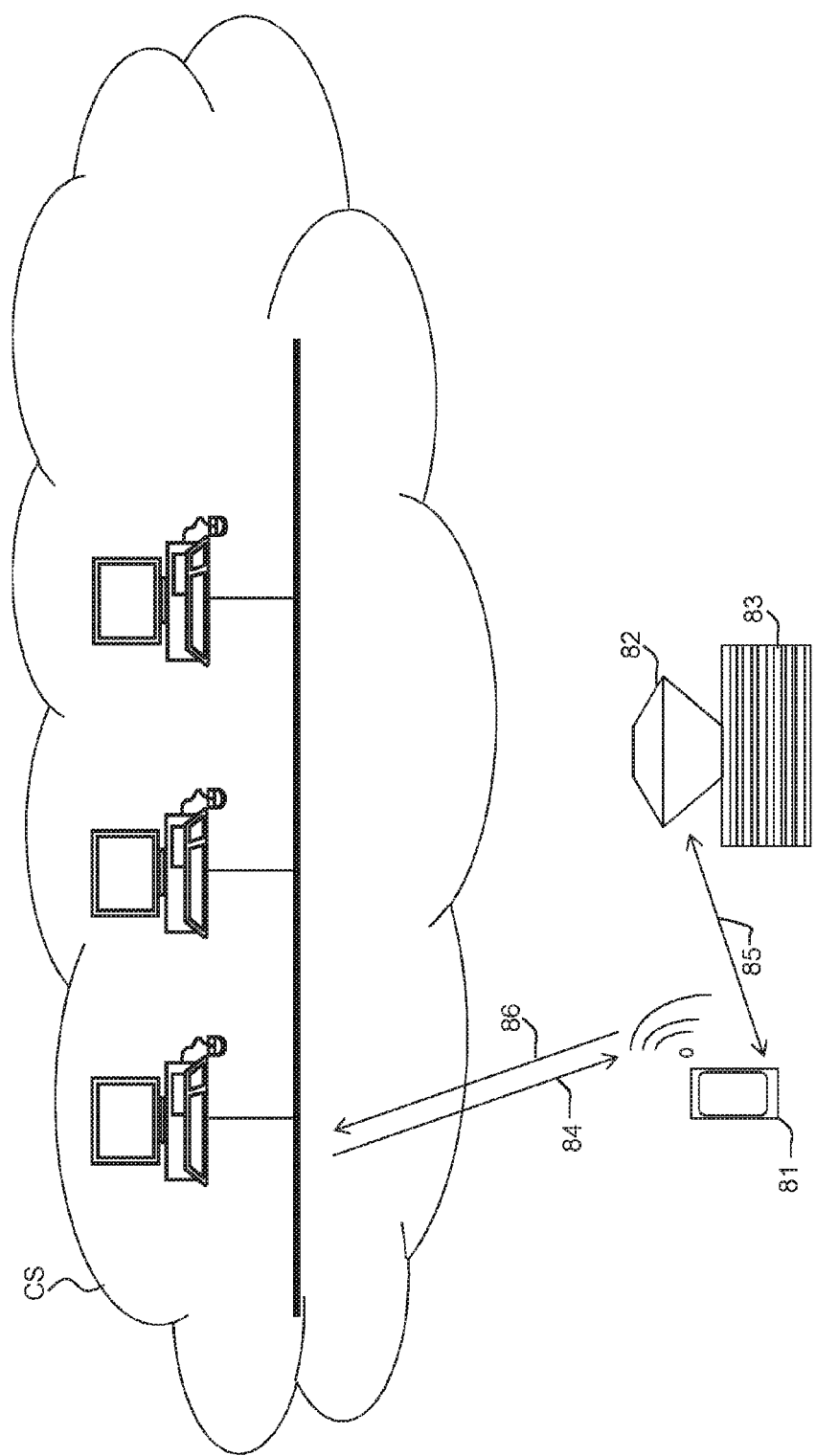

FIG. 8 elucidates a fourth case, wherein a user wants to know which print job has been assigned to an activated electronic beacon 82, which is close to a mobile device 81 of the user. The activated electronic beacon 82 has been put on top of a stack 83 of sheets. The blue-tooth system, as indicated by a double-sided arrow 85, detects the proximity of the activated electronic beacon 82 and the mobile device 81. The mobile device 81 sends an electronic signal 86 to the cloud system CS that the proximity of the electronic beacon 82 and the mobile device 81 has been detected. The electronic signal 86 comprises the identification number of the electronic beacon 82. The cloud system CS determines by means of the job planning application and the identification number of the electronic beacon 82 which print job is assigned to the activated electronic beacon 82. An electronic signal 84 is sent from the cloud system CS to the mobile device 81 with job information of the print job assigned to the activated electronic beacon 82. The job information of the print job is displayed on the mobile device 81.

Figure 9:
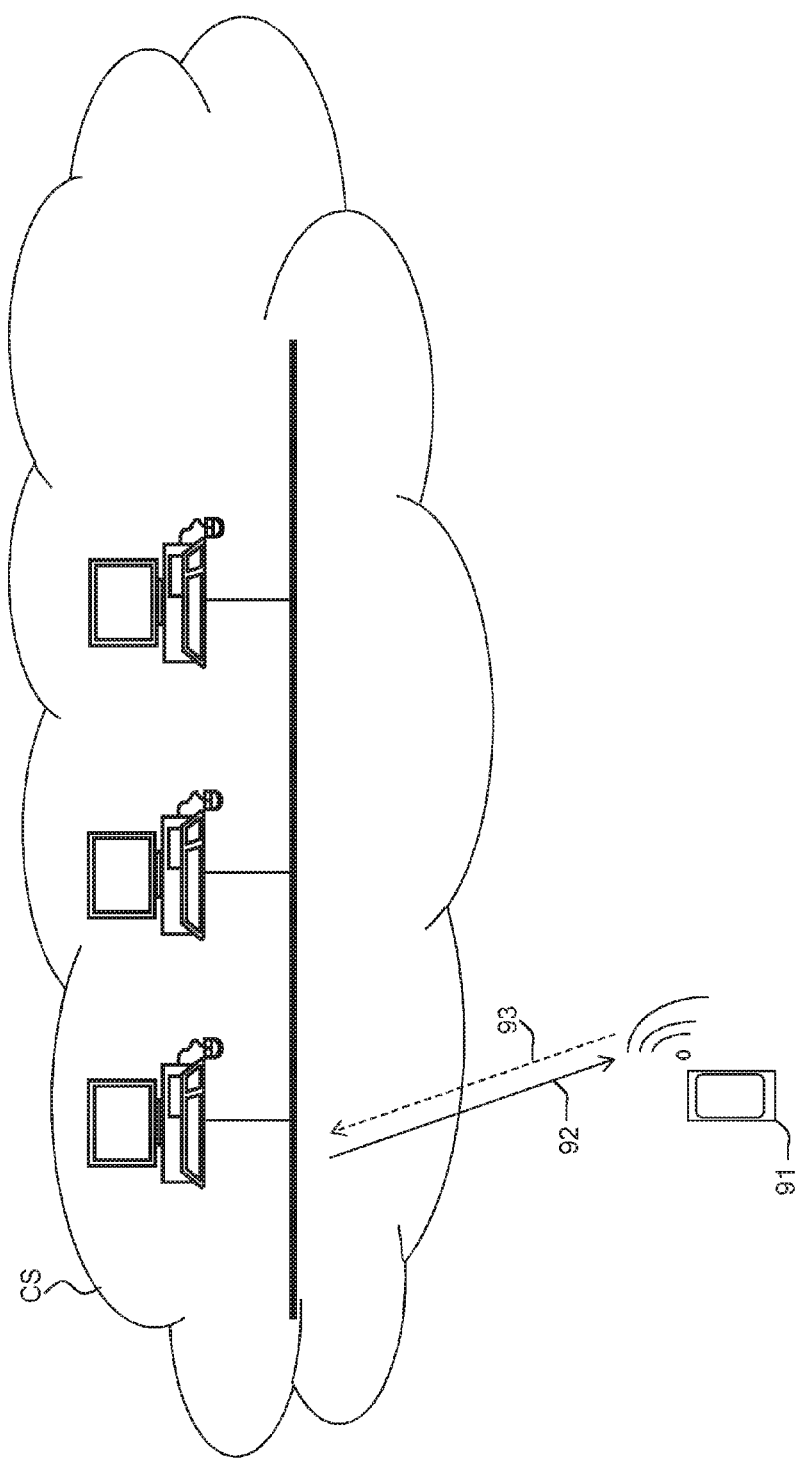

FIG. 9 elucidates a fifth case, wherein a rush job enters the planning application residing in the cloud system CS. The rush job is a job that has a high priority and a near due date. The planning application has an overview of print jobs assigned to the plurality of mobile devices in the printed product production process environment. The planning application may calculate a delay in the planning of all assigned print jobs and selects a mobile device 91 for assigning the rush job to. The selection of the mobile device 91 may be based on a key operator dedicated qua skills for the rush job or may be based on an available operator. The planning application sends an alert signal 92 from the cloud system CS to the mobile device 91. The operator having the mobile device 91 may refuse the rush job by sending an electronic signal 93 to the cloud system CS, but such a refusal will be seldom due to the fact that a rush job has a highest priority. When accepted, the job list on the mobile device 91 is synchronized with the planning application in the cloud system CS.

Figure 10:
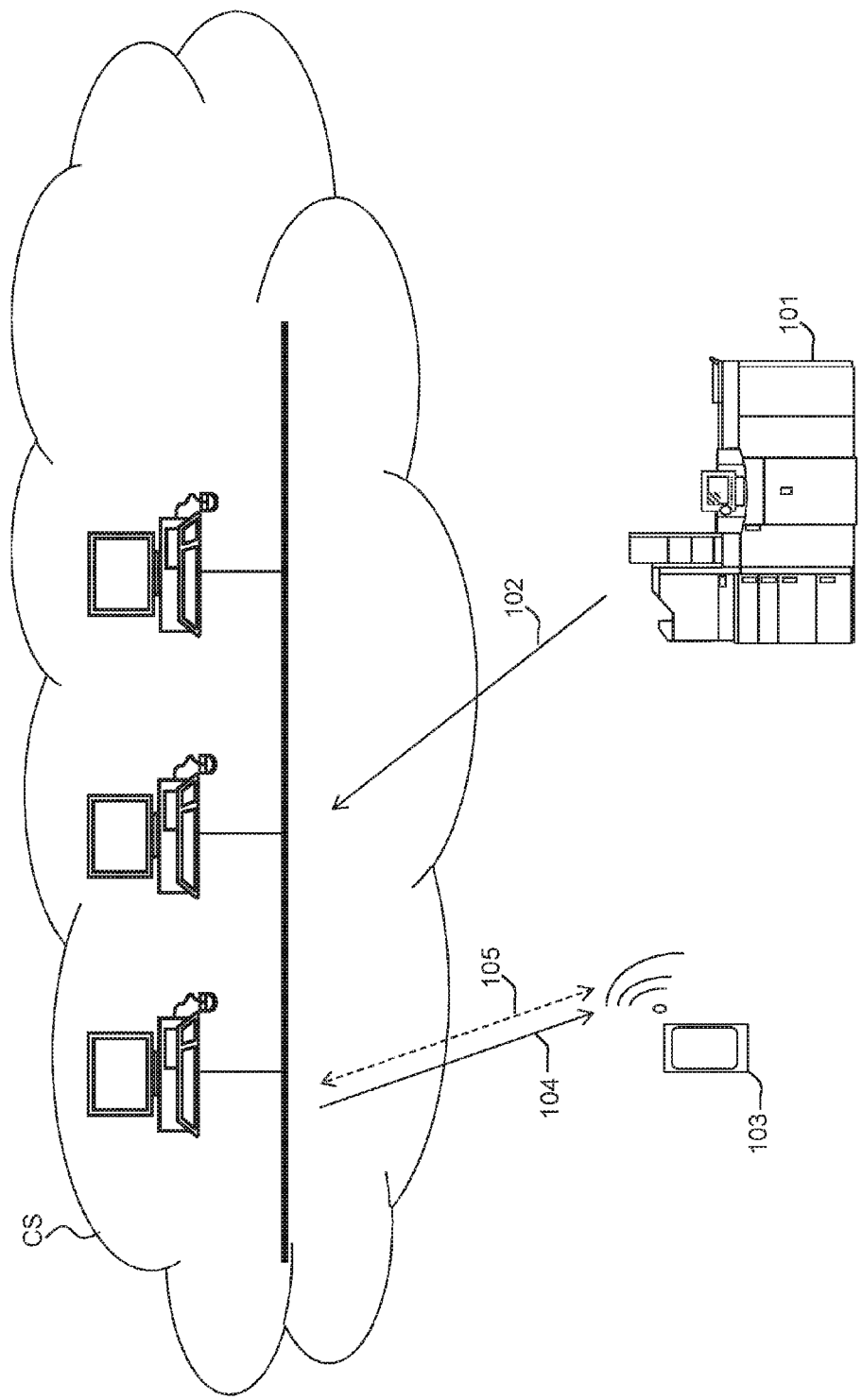

FIG. 10 elucidates a sixth case, wherein a production module 101 is sending a request signal 102 to the cloud system CS for maintenance of the production module 101 in the printed product production process environment. The maintenance task may be a refill of a recording material or other media needed by the production module 101, if the production module 101 is a printing system, or a refill of finishing material if the production module 101 is a finishing module 101, for example a refill of staples or binding cords. The planning application in the cloud system CS receives the maintenance request 102 and defines a task for one of the available operators in the printed product production process environment. The planning application updates the tasks of the operator and synchronizes the planning application with the job/task list on a mobile device 103 of the one available operator via a first signal 104 from the cloud system CS to the mobile device 103. The mobile device 103 is at regular time basis synchronized with the cloud system CS via a second signal 105 regarding the job list.

Figure 11:
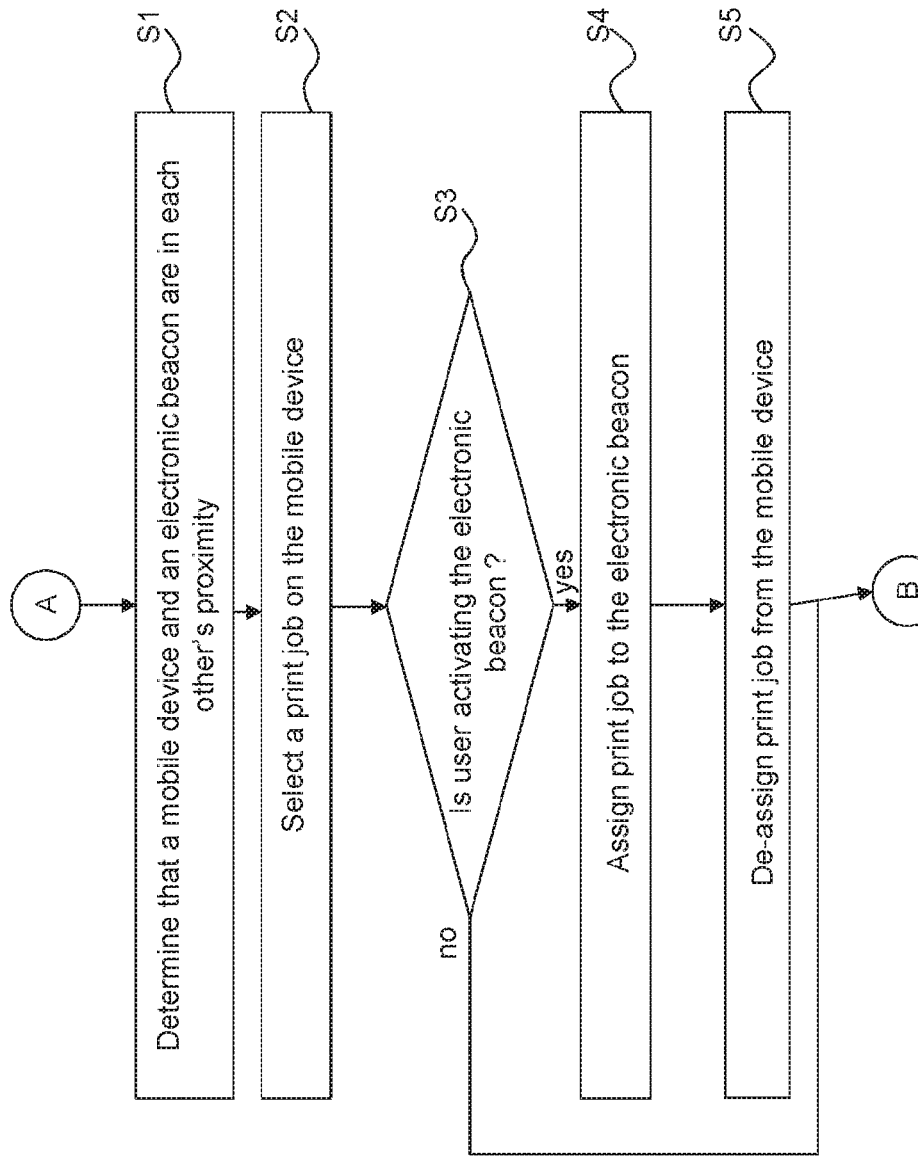
FIGS. 11-13 are flow diagrams of methods according to the present invention.

FIG. 11 is a flow diagram of a first method according to the present invention. The method is used for tracking jobs in the printed product production process environment. From a starting point A, a first step S1 is reached.

According to the first step S1, it is determined that a mobile device and an electronic beacon are in each other's proximity. The electronic beacon is in a de-activated state. The determination may take place according to a first option by a detector of the mobile device, according to a second option by a detector of the beacon or according to a third option by a detector of the cloud system. The determination in the first two options is submitted to the cloud system. A planning application in the cloud system registers the pair of identifiers of the mobile device and the electronic beacon.

According to a second step S2, a print job is selected on the mobile device. On the mobile device, a job list for the user is displayed, and a job is selectable from the job list.

According to a third step S3, it is checked if the electronic beacon is activated by the user. If so, the method proceeds with a fourth step S4, otherwise the method ends in end point B.

According to the fourth step S4, the selected print job is assigned to the electronic beacon. The electronic beacon receives an electronic signal of activation of the electronic beacon by the operating mechanism, for example the springs 26, of the electronic beacon. The user whose mobile device is in the proximity of the electronic beacon has activated the electronic beacon. The mobile device has detected the electronic beacon and has established the identification number of the beacon. The mobile device sends an electronic signal to the planning application in the cloud system. The electronic signal comprises the identification number of the electronic beacon and the selected job. The planning application in the cloud system updates a list of pairs of electronic beacons and assigned jobs. The planning application in the cloud system also updates the list of pairs of mobile devices and assigned jobs. A pair of the activated electronic beacon and the selected job is created in the planning application.

According to a fifth step S5, the selected print job is de-assigned from the mobile device and will disappear from the job list on the mobile device. The planning application in the cloud system updates the list of pairs of mobile devices and assigned jobs. The planning application in the cloud system updates the list of pairs of electronic beacons and assigned jobs. The pair of the mobile device and the selected job is removed from the planning application.

The fourth step S4 and the fifth step S5 may be exchanged qua order or may be processed in parallel.

Figure 12:
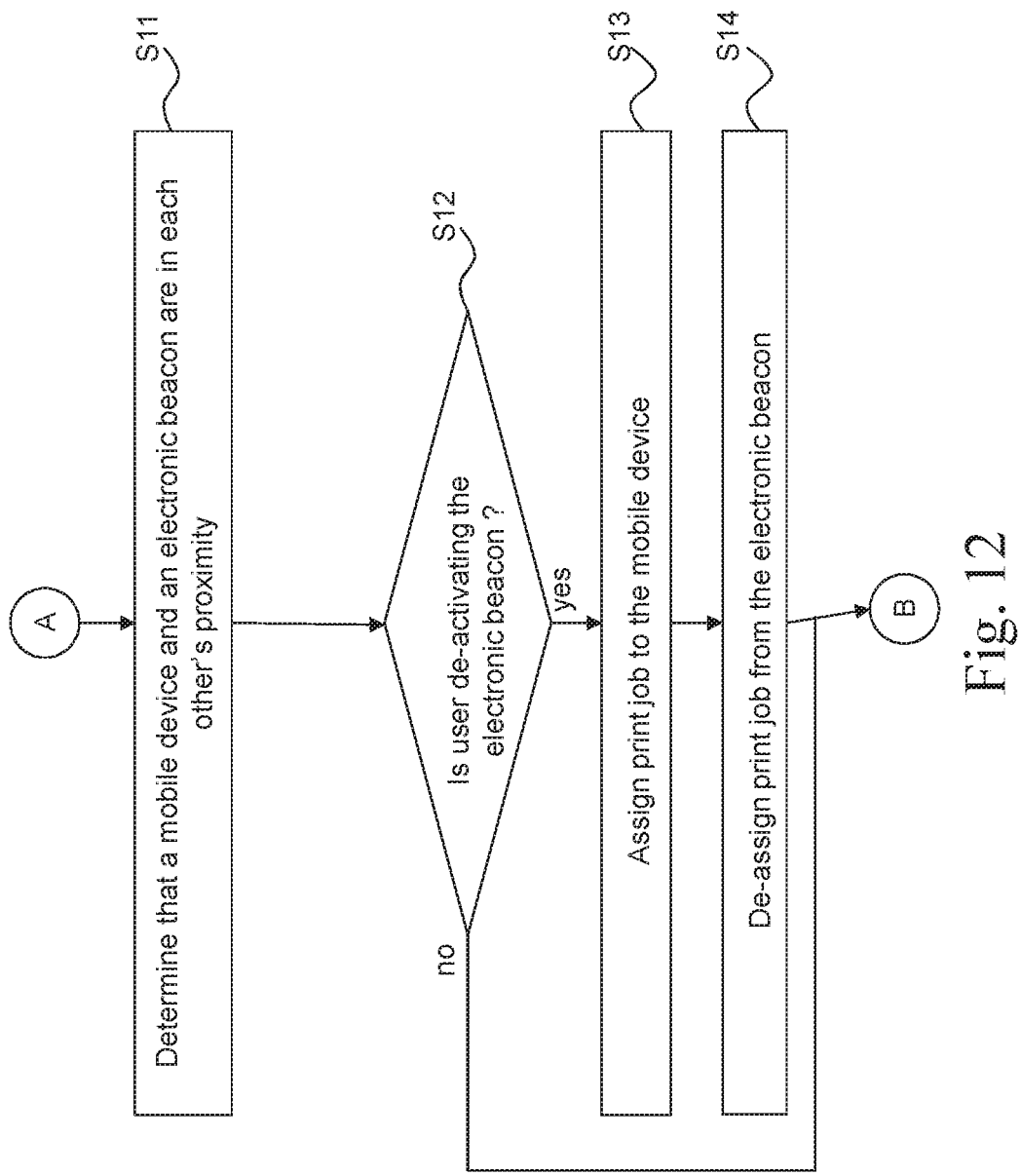

FIG. 12 is a flow diagram of a second method according to the present invention. The method is used for tracking jobs in the printed product production process environment. From a starting point A, a first step S11 is reached.

According to the first step S11, it is determined that a mobile device and an electronic beacon are in each other's proximity. The electronic beacon is in an activated state. The determination may take place according to a first option by a detector of the mobile device, according to a second option by a detector of the beacon or according to a third option by a detector of the cloud system. The determination in the first two options is submitted to the cloud system. A planning application in the cloud system registers the pair of identifiers of the mobile device and the electronic beacon.

According to a second step S12, it is checked if the electronic beacon is de-activated by the user. If so, the method proceeds with a third step S13, otherwise the method ends in end point B.

According to the third step S13, the selected print job is assigned to the mobile device. The electronic beacon receives an electronic signal of de-activation of the electronic beacon by the operating mechanism, for example the springs 26, of the electronic beacon. The user whose mobile device is in the proximity of the electronic beacon has de-activated the electronic beacon. The mobile device has detected the electronic beacon and has established the identification number of the electronic beacon. The mobile device sends an electronic signal to the planning application in the cloud system. The electronic signal comprises the identification number of the electronic beacon. The planning application in the cloud system retrieves the print job assigned to the electronic beacon and de-assigns the print job from the electronic beacon. The planning application updates a list of pairs of electronic beacons and assigned jobs. The planning application in the cloud system also updates the list of pairs of mobile devices and assigned jobs. A pair of the de-activated electronic beacon and the selected job is removed from the planning application.

According to a fourth step S14 the print job is re-assigned from the electronic beacon to the mobile device and will appear in the job list on the mobile device. The planning application in the cloud system updates the list of pairs of mobile devices and assigned jobs. The planning application in the cloud system updates the list of pairs of electronic beacons and assigned jobs. The pair of the mobile device and the print job is created by the planning application.

The third step S13 and the fourth step S14 may be exchanged qua order or may be processed in parallel. The method ends in endpoint B.

Figure 13:
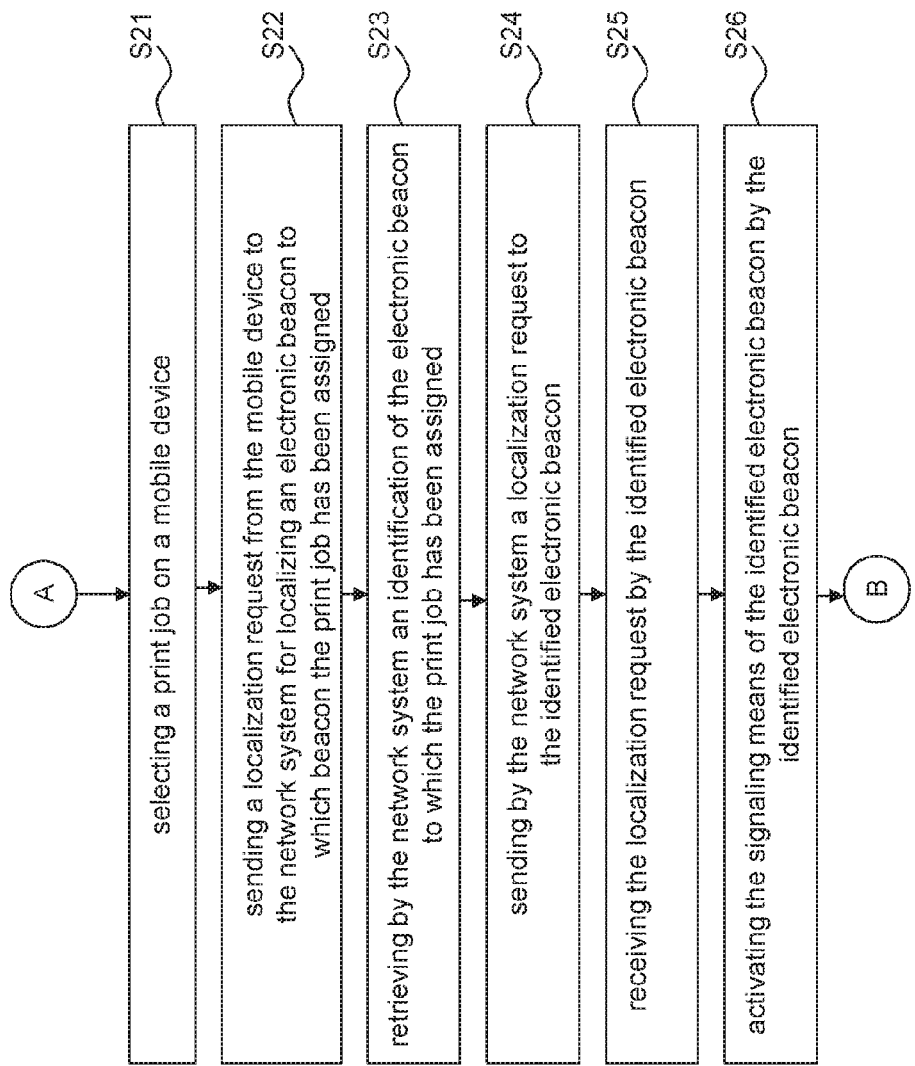

FIG. 13 is a flow diagram of a third method according to the present invention. The method is used for tracking jobs in the printed product production process environment. From a starting point A, a first step S21 is reached.

According to the first step S21, a print job is selected on a mobile device from a job list displayed on the mobile device. The job list is received from the planning application in the network system at regular time basis according to a synchronization principle.

According to a second step S22, a localization request is sent from the mobile device to the network system for localizing an electronic beacon, to which beacon the selected print job has been assigned.

According to a third step S23, the network system retrieves an identification of the electronic beacon to which the print job has been assigned. The identification may be retrieved from a list of pairs of activated electronic beacons and the print jobs assigned to the electronic beacons. A planning application running on a work station in the network system may maintain such list of pairs.

According to a fourth step S24, the network system sends a localization request to the identified electronic beacon.

According to a fifth step S25, the identified electronic beacon receives the localization request.

According to a sixth step S26, the identified electronic beacon activates the signaling device of the identified electronic beacon. The signaling device sends out a light or sound. The user may perceive this sound or light and now knows where the electronic beacon he has searched for is located in the printed product production process environment. The method ends in end point B.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic beacon for localizing a physical intermediate product in a printed product production process, the printed process production process comprising production modules for producing physical intermediate products and/or physical end products according to a print job for the printed product production process, wherein the electronic beacon is digitally assignable to the print job and is placeable on top of, attachable to or insertable in a physical intermediate product resulting from the print job or a physical end product resulting from the print job, the electronic beacon comprising:
   a receiver configured to receive a localization request issued by a mobile device;
   a signaling device configured to provide an electronic signal when the localization request is received by the receiver;
   a proximity detector configured to detect if the mobile device is in the proximity of the electronic beacon;
   a transmitter for sending an assignment request for removing an assignment of the print job from the electronic beacon and for adding an assignment of the print job to the mobile device, which is determined to be in the proximity of the electronic beacon by the proximity detector, and for sending an assignment request for removing an assignment of the print job from the mobile device which is determined to be in the proximity of the electronic beacon by the proximity detector, and for adding an assignment of the print job to the electronic beacon; and a switch configured to deactivate the electronic beacon, wherein upon deactivation of the electronic beacon by the switch the assignment request is sent by the transmitter.

2. The electronic beacon according to claim 1, wherein the switch is configured to activate the electronic beacon, and wherein upon activation of the electronic beacon by the switch, a further assignment request is sent by the transmitter.

3. The electronic beacon according to claim 1, wherein the signaling device comprises at least one of a light signaling device and a sound signaling device.

4. The electronic beacon according to claim 3, wherein the signaling device is configured to issue an electronic signal in accordance with a rhythm applied to the mobile device.

5. The electronic beacon according to claim 2, wherein the switch is configured to change the shape of the electronic beacon when the electronic beacon is activated or deactivated.

6. The electronic beacon according to claim 5, wherein the switch comprises a pressing mechanism to enlarge the footprint of the electronic beacon when the electronic beacon is activated in order to establish a stable upright position of the electronic beacon due to the larger footprint, and reduce the footprint of the electronic beacon when the electronic beacon is deactivated in order to establish a tilt of the electronic beacon from the upright position of the electronic beacon.

7. A method of using an electronic beacon comprising the steps of:

placing the electronic beacon according to claim 1 on top of, attached to or inserted in the physical intermediate product or the physical end product after the physical intermediate product or the physical end product is processed by a production module; and removing the electronic beacon from the physical intermediate product before the physical intermediate product is processed by a next production module.

8. A print system comprising:

a plurality of production modules for producing the physical intermediate products and the physical final products;

a plurality of the electronic beacon according to claim 1; and at least one mobile device configured for installing and running an application for displaying a selection list of tasks of the print jobs for the print system, wherein the at least one mobile device is synchronizable by means of an at least partially wireless network system with the plurality of production modules and with the plurality of electronic beacons.

9. A method for tracking jobs in the print system according to claim 8, the method comprising the steps of:

determining that the mobile device and the electronic beacon are in each other's proximity;

upon activation of the electronic beacon, assigning the print job selected on the mobile device to the electronic beacon; and upon the deactivation of the electronic beacon, de-assigning the print job from the electronic beacon and assigning the print job to the mobile device.

10. A method for tracking jobs in the print system according to claim 8, the method comprising the steps of:

selecting the print job on the mobile device;

sending the localization request from the mobile device to the network system for localizing one of the plurality of electronic beacons, said one electronic beacon having the print job assigned thereto;

retrieving by the network system an identification of said one electronic beacon to which the print job has been assigned;

sending by the network system the localization request to said one electronic beacon;

receiving the localization request by said one electronic beacon; and activating the signaling device of said one electronic beacon.

11. A non-transitory recording medium comprising computer executable program code configured to instruct at least one computer to perform the method according to claim 9.

12. A non-transitory recording medium comprising computer executable program code configured to instruct at least one computer to perform the method according to claim 10.

* * * * *